Dec. 5, 1944.  L. WALDRON  2,364,176
BALL STUD RETAINER
Filed April 3, 1943
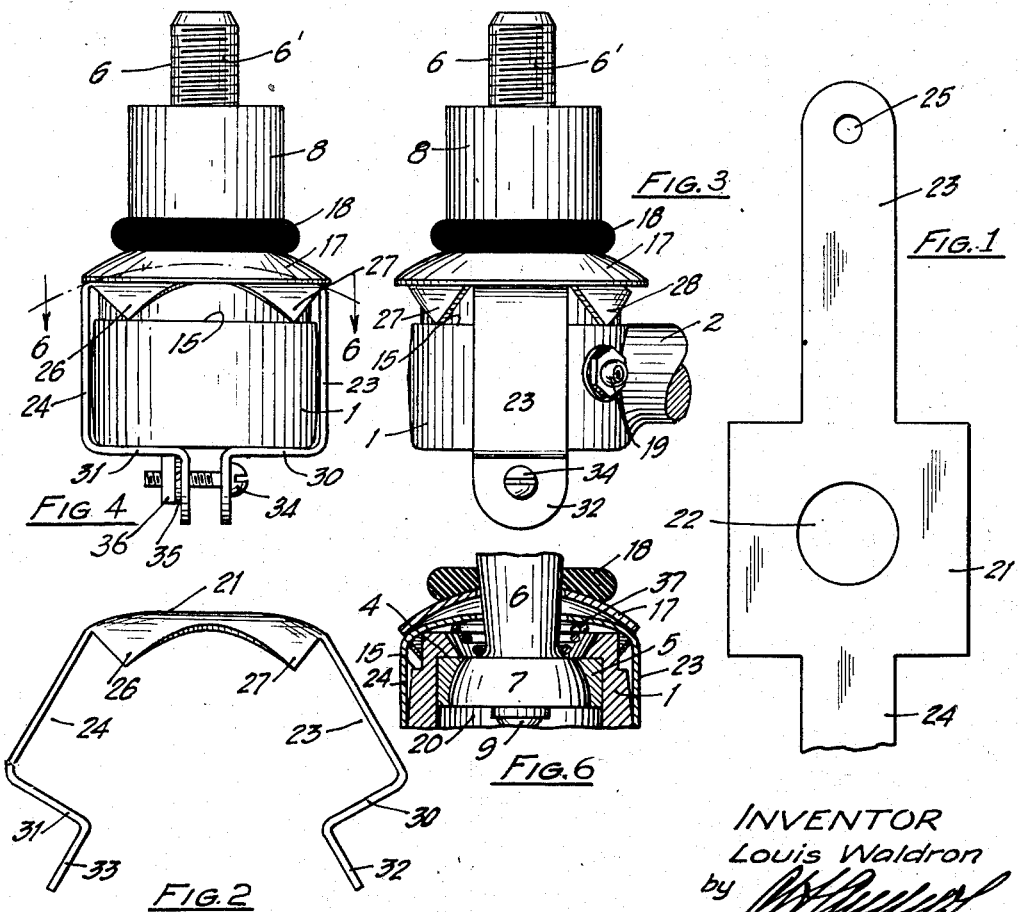
INVENTOR
Louis Waldron
by
ATTORNEY Patented Dec. 5, 1944

2,364,176

UNITED STATES PATENT OFFICE 2,364,176

BALL STUD RETAINER

Louis Waldron, Albany, N. Y., assignor of one-third to John J. Cronin and one-third to Eugene J. Hoerdt, both of Albany, N. Y.

Application April 3, 1943, Serial No. 481,782

8 Claims. (Cl. 287—90)

My invention relates to motor vehicles and more particularly to a safety device adapted to be applied to a ball and socket connection in the steering mechanism of an automobile whereby the ball stud is prevented from popping out of its socket due to excessive wear either on the ball, the socket, or on both.

At the present time replacement parts for automobiles are difficult to obtain and for this reason many vital parts must be used until they are worn far beyond the point where, under normal conditions, they would be replaced. Among these very vital parts is the ball and socket joint which connects the steering arm associated with each of the wheel assemblies with the tie rod leading to the steering column mechanism.

These joints are difficult to lubricate properly and to maintain properly lubricated, with the result that they wear rapidly and many accidents are believed to be directly attributable to such excess wear in these ball and socket joints as to permit the ball stud to pop out of its socket. When this occurs steering control is lost and an accident is inevitable.

The principal object of my invention therefore is to provide a simple and effective means for preventing such accidents, and which may be easily applied to any ball and socket joint of this type.

With this object in view my invention includes the novel elements and the combinations and arrangements thereof described below and illustrated in the accompanying drawing in which—

Fig. 1 is a fragmentary plan view of a metal strip illustrating the blank from which my ball stud retainer is formed;

Fig. 2 is a side elevation view of the finished retainer before it is positioned on the joint;

Fig. 3 is an elevation view of a joint with one of my retainers positioned thereon;

Fig. 4 is a side elevation of the device as shown in Fig. 3;

Fig. 5 is a section of Fig. 4 along approximately the curved section line 6—6; and Fig. 6 is a fragmentary sectional elevation view through the center of a ball and socket joint with my retainer in place thereon.

Referring to the drawing, the ball and socket joint comprises a socket housing 1 which is formed integral with the tie rod 2 which is connected to the steering column mechanism by means (not shown). The housing is provided at the top with an inturned flange 4 against which the ball socket 5 is seated. The ball stud 6 is provided at its lower end with a ball 7 which cooperates with the socket 5, and at the upper end is threaded, as shown at 6', to receive a nut (not shown) which holds the steering arm 8 on the stud. At the top, the exterior of the housing is provided with an annular shoulder 15 upon which ordinarily rests a dust cap seat (not shown). The dust cap 17 is ordinarily supported on the upper edge of the seat and a resilient packing 18 is compressed between the bottom of steering arm 8 and the top of the dust cap. By reference to Figs. 3 and 5 it will be noted that the housing is provided with a grease gun fitting 19 and, although the grease passage is not shown, it will be understood that this passage opens within the housing in the space 20.

Although short grease grooves are usually provided between the ball and socket near the bottom of their cooperating surfaces it is very difficult to force the grease between these cooperating surfaces beyond the grooves and at the top thereof because of the extremely close fit. For this reason the cooperating surfaces of the ball and socket wear quite rapidly, the ball projects further and further upwardly into its socket and finally, and suddenly, becomes separated therefrom whereupon all connection between the steering gear and at least one of the wheels is severed.

To prevent accidental separation of the ball and socket I propose to replace the dust cap seat with a metal strap formed from a blank such as shown in Fig. 1. This blank has a preferably square central portion 21 with an aperture 22 therein adapted to permit the passage of the ball stud therethrough. Projecting from opposite sides of the central portion are two straplike portions 23 and 24 which are apertured at the ends, as shown at 25, for the reception of a means for securing the ends of the straps together. The blank shown in Fig. 1 is preferably, but not necessarily, preformed into the shape shown in Fig. 2 before it is applied to the joint. That is, the corners of the square portion are bent downwardly as shown at 26, 27, 28 and 29 to form four depending prongs adapted to engage the exterior of the socket housing at the top as shown in Figs. 3, 4 and 5. The straps 23 and 24 are also bent downwardly as shown in Fig. 2 and then inwardly at right angles to form portions 30 and 31 which are spaced from the central portion a distance adapting them to engage the bottom of the socket housing, as shown in Fig. 4 when the portion 21 is in contact with the top of the housing; the aggregate length of the portions 30 and 31 being somewhat less than the outside diameter of the housing. The free ends of the strap portions 23 and 24 are then bent downwardly at right angles to the adjoining portions 30 and 31, respectively, to form the juxtaposed portions 32 and 33.

In applying my ball stud retainer to the joint, the steering arm 8, the packing 18, the dust cap 17, and the dust cap seat are first removed. The helical spring 37 (see Fig. 6) is dropped over the ball stud with the small end down so that it rests on the top of the ball. This spring is designed to be compressed between the top of the ball and the bottom of my ball stud retainer in order to reduce the wear on the ball and socket by reducing the pressure which holds them together, and also to make it easier to force grease between their cooperating surfaces. The retainer, preferably preformed to the shape shown in Fig. 2, is then dropped over the ball stud. The straps 23 and 24 are then bent inwardly toward each other as shown in Fig. 4 to embrace the housing and are secured together in place by means of a stove bolt 34, the lock washer 35, and nut 36. The depending prongs 26, 27, 28 and 29 may then be pounded into close engagement with the housing. The top of my ball stud retainer functions as a dust cap seat and the dust cap is supported thereon as shown in Figs. 3 and 4. The packing 18 and the steering arm 8 are then replaced as shown.

From the foregoing it will be apparent that wear of the ball and socket will not only be reduced but it will be impossible for the socket housing to drop away from the ball.

The metal from which the ball retainer is formed is preferably of steel and in practice it has been found that a thickness of from 0.040" to 0.050" performs satisfactorily and is comparatively easily bent in assembling.

What I claim is:

1. A ball stud retainer for the steering gear of an automobile comprising a metal strap having a central portion provided with an aperture adapted to permit the ball stud of a ball and socket joint to pass therethrough and having marginal portions on said central portion adapted to be bent downwardly to engage the sides of the socket housing of said joint, and oppositely disposed straps extending from said central portion adapted to be bent downwardly along the sides of said housing and across the bottom thereof; the ends of said straps being provided with apertures adapted to be brought into alignment under said housing for the reception of a securing means.

2. In a safety device of the character described, the combination with a ball and socket joint of an automobile steering mechanism including a ball stud and a housing for said socket, of a ball stud retainer comprising a metal strap through which said ball stud passes and which extends substantially around said socket in close engagement therewith, a spring surrounding said stud and compressed between said ball and said strap, and means securing the ends of said strap together.

3. A ball stud retainer for a ball and socket joint in the steering mechanism of an automobile comprising a metal strap having a substantially square central portion provided with a centrally disposed aperture therein for the passage of said stud therethrough; the corners of said square portion being angularly disposed to said portion and adapted to embrace the end of a cylindrical housing for said socket; and strap-like portions extending outwardly from opposite sides of said central portion and adapted to be bent downwardly along the sides of said housing and under the bottom thereof; the free ends of said strap-like portion being apertured for the reception of a securing means.

4. A device adapted to retain in place the ball stud of a worn ball and socket joint in the tie rod of an automobile steering mechanism and comprising a metal strap having a center portion provided with a centrally disposed aperture of a size adapted to permit said stud but not said ball to pass therethrough; said central portion having marginal portions depending somewhat below the apertured portion adapted to engage the exterior of said housing around the top thereof; and aligned, strap-like portions extending outwardly from opposite edges of said central portion and adapted to be bent downwardly along opposite side portions of said housing and under the bottom thereof to secure said device in place.

5. A ball stud retainer adapted to prevent separation of the ball stud and housing of a worn ball and socket connection in the steering gear of an automobile and comprising a metal strap having a central portion provided with a circular opening therein of a diameter intermediate the diameter of said stud and the diameter of the ball thereon, whereby said stud but not said ball may pass therethrough; said central portion being of a size adapted substantially to cover the top of said housing and to form a substantially continuous seat for a dust cap; oppositely disposed straps integral with said central portion adapted to extend downwardly along opposite sides of said housing and under the bottom thereof with their end portions in juxtaposed relation, and means for securing said end portions of said straps together.

6. The combination with a ball and socket connection in the tie rod of an automobile steering mechanism, including a ball stud and a housing, of a safety device for preventing separation of said stud and housing when worn and comprising a metal strap having a central portion substantially covering the top of said housing and provided with an aperture therein through which said stud passes; said aperture being substantially smaller than said ball whereby to prevent its passage therethrough; and portions integral with and narrower than said central portion extending downwardly along the opposite sides of said housing and under the bottom thereof in close engagement with said housing, and means securing said last mentioned portions together under said housing.

7. The structure set forth in claim 5 including a spring surrounding said stud and compressed between said ball and said strap.

8. The structure set forth in claim 6 including a spring surrounding said stud and compressed between said ball and said strap.

LOUIS WALDRON.